United States Patent [19]

Brown

[11] Patent Number: 5,281,010

[45] Date of Patent: Jan. 25, 1994

[54] PUMPBACK ADAPTIVE BRAKING SYSTEM WITH SLAVE ISOLATION VALVE

[75] Inventor: George E. Brown, Niles, Mich.

[73] Assignee: Allied-Signal Inc., Morristown, N.J.

[21] Appl. No.: 979,082

[22] Filed: Nov. 19, 1992

[51] Int. Cl.⁵ .............................................. B60T 8/32
[52] U.S. Cl. .............................. 303/113.2; 303/115.5;
303/116.2; 303/117.1; 303/119.1; 303/900;
303/901; 303/84.2
[58] Field of Search .............. 303/116.4, 116.2, 116.1,
303/117.1, 113.2, 113.3, 113.5, 119.1, 119.2,
116.3, 68–69, 113.1, 115.1, 115.5, 115.4, 110,
900, 901, 84.1, 84.2; 188/181 A, 181 R; 180/197

[56] References Cited

U.S. PATENT DOCUMENTS

| | | | |
|---|---|---|---|
| 4,618,189 | 10/1986 | Nakanishi et al. | 303/115.4 |
| 4,725,105 | 2/1988 | Brown | 303/116.4 |
| 4,778,226 | 10/1988 | Brown | 303/116.1 |
| 4,838,620 | 6/1989 | Sypniewski | 303/116.1 |
| 4,869,561 | 9/1989 | Gatt et al. | 303/116.1 |
| 5,037,161 | 8/1991 | Tackett | 303/115.4 |
| 5,039,176 | 8/1991 | Hellmann et al. | 303/116.1 |
| 5,114,216 | 5/1992 | Tsuda et al. | 303/115.4 X |
| 5,137,339 | 8/1992 | Brown | 303/113.2 |
| 5,163,474 | 11/1992 | Rizk | |
| 5,172,963 | 12/1992 | Brown | 303/113.2 X |

FOREIGN PATENT DOCUMENTS

| | | | |
|---|---|---|---|
| 2214250 | 8/1989 | United Kingdom | 303/116.2 |
| 9105689 | 5/1991 | World Int. Prop. O. | 303/116.2 |

Primary Examiner—Douglas C. Butler
Attorney, Agent, or Firm—Larry J. Palguta; Ken C. Decker

[57] ABSTRACT

The closed circuit, pump-back adaptive braking system (10, 110, 210, 310, 410) includes a slave isolation valve mechanism (30, 30', 30", 130, 330, 330') which has a valve member (34, 34', 34", 134, 334, 334') that permits master cylinder (12) generated hydraulic braking pressure to oppose pressure received from the pump (23) of the braking system (10, 110, 210, 310, 410) in order to prevent displacement of the valve member (34, 34', 34", 134, 334, 334') when the pump (23) is not operating. When the pump (23) of the system (10, 110, 210, 310, 410) is operating, the valve member (34, 34', 34", 134, 334, 334') is displaced to isolate substantially the master cylinder (12) from an electrically actuated valve mechanism (40, 40') during operation of the adaptive braking system (10, 110, 210, 310, 410).

14 Claims, 5 Drawing Sheets

PUMPBACK ADAPTIVE BRAKING SYSTEM WITH SLAVE ISOLATION VALVE

The present invention relates generally to an adaptive braking system, and in particular to a pump-back adaptive braking system which includes a slave isolation valve for isolating the master cylinder during operation of the system.

Pump-back adaptive braking systems have been utilized in many forms on automotive vehicles. Some of these adaptive braking systems utilize a shuttle valve which isolates the master cylinder from pump generated pressure during operation of the adaptive braking system. Typically, the shuttle valve may include a shuttle build orifice to provide a restricted fluid flow from the pump to the wheel brake during adaptive braking system operation. The optimization of the shuttle valve in multiple valve systems can prove to be difficult. One alternative is to replace the shuttle valve with fixed build orifices, however this requires an isolation solenoid valve for each master cylinder circuit and any cost savings realized is minimal. It is highly desirable to provide an improved low cost adaptive braking system having minimal complexity and functional risk. It is desirable to eliminate the shuttle valves and to reduce brake pedal drop and fast build that can result when a shuttle valve opens and when master cylinder pressure exceeds accumulator pressure. It is highly desirable to provide an adaptive braking system that requires only one solenoid valve per channel. Brown U.S. Pat. No. 4,725,105 discloses an anti-lock braking system only for the rear wheels of a vehicle and having a valve element that isolates the master cylinder during anti-lock braking system operation. It is also desirable that such an adaptive braking system should be easily modified to add a traction control function with minimal revision. Adaptive braking systems which include shuttle valves are disclosed in copending Patent application Nos. 07/792,550; 07/872,480; and 07/938,790; and Rizk U.S. Pat. No. 5,163,474 all assigned to the same assignee as herein.

The present invention provides solutions to the above problems by providing a closed circuit, pump-back adaptive braking system for an automotive vehicle having a pair of axles with a pair of wheels and brakes on each axle, said system including a master cylinder for actuation by a vehicle operator, said master cylinder having a pressure chamber in which hydraulic braking pressure is developed when a brake application is effected, a first braking circuit hydraulically communicating said pressure chamber with one brake controlling a wheel on one of said axles, the first braking circuit comprising a slave isolation valve connected with electrically actuated valve means communicating with the one brake, the electrically actuated valve means communicating with a first line connected with an inlet side of a pump and said first line communicating with sump means, the pump including an outlet communicating with both the slave isolation valve and restriction means at a point therebetween, the restriction means located in a line disposed in parallel with said isolation slave valve so that fluid pressure from the pump to the electrically actuated valve means bypasses the slave isolation valve, the slave isolation valve having a master cylinder chamber communicating with the master cylinder, and a return line communicating the one brake with the pressure chamber of the master cylinder and including check valve means, hydraulic braking pressure received from the pressure chamber of the master cylinder causing said slave isolation valve to remain in an open position when said pump is not operating, and operation of said pump causing said slave isolation valve to close and isolate the pressure chamber of the master cylinder from the electrically actuated valve means.

The invention is described in detail below with reference to the drawings which illustrate embodiments in which.

Figure 1:
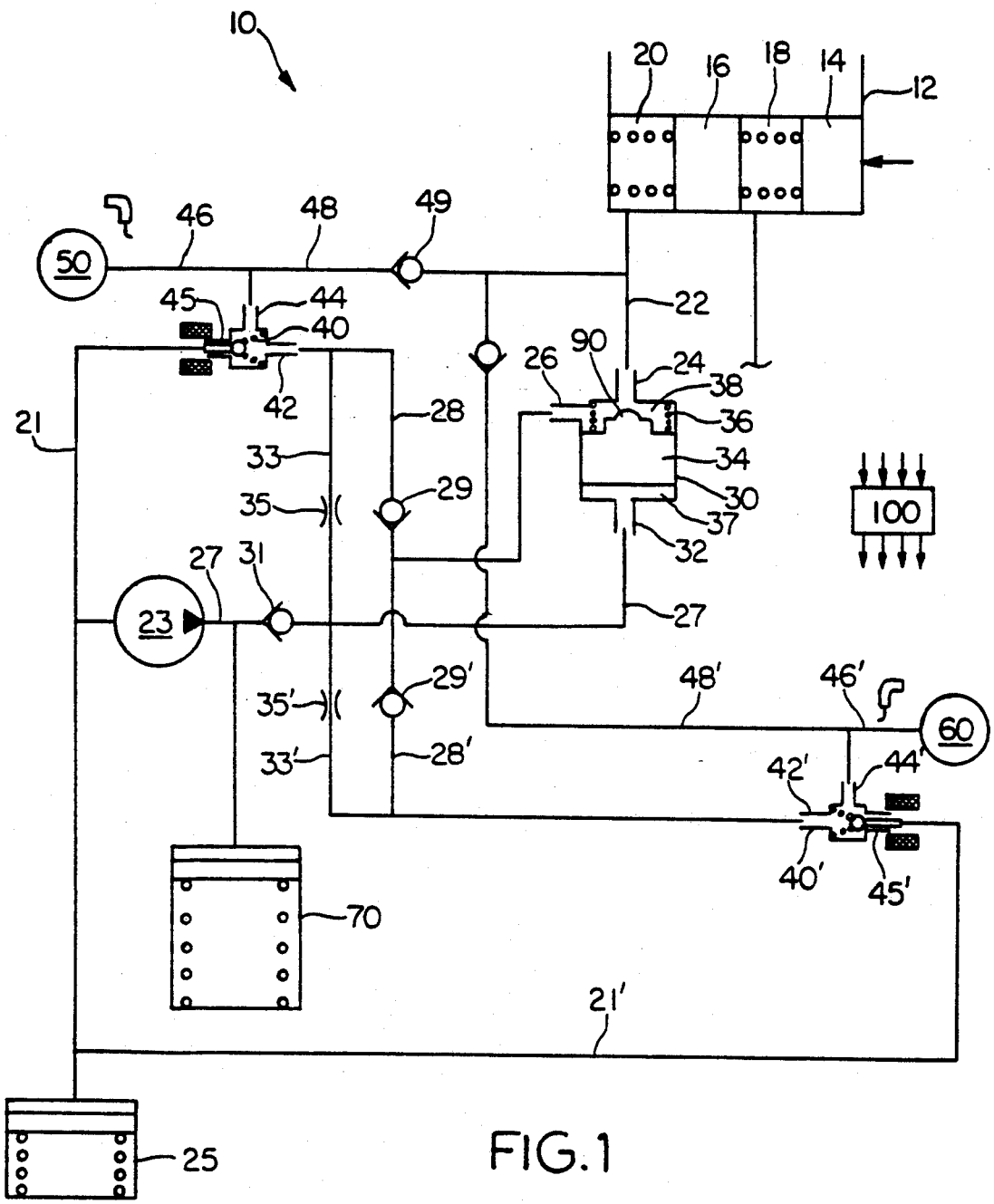
FIG. 1 is a schematic illustration of an adaptive braking system having a slave isolation valve in accordance with the present invention.

Referring to FIG. 1, an adaptive braking system is designated generally by reference numeral 10. Braking system 10 includes master cylinder 12 having a pair of pistons 14, 16 and a pair of pressure chambers 18, 20. Each of the chambers 18 and 20 is connected with an identical circuit in a cross or "X" type braking circuit, and therefore only one of the circuits is illustrated. Pressure chamber 20 communicates with line connection 22 that connects with master cylinder inlet 24 of slave isolation valve 30. Slave isolation valve 30 includes outlet 26 that communicates via line 28 with electrically actuated valve 40. Line 28 includes a one-way check valve 29 so that fluid may not flow from line 28 to line 28'. Electrically actuated valve 40 includes inlet 42 which receives line 28 and first outlet 44 which communicates with right front wheel brake 50 via line 46. Return line 48 communicates wheel brake 50 with master cylinder pressure chamber 20 and includes one-way check valve 49. Electrically actuated valve 40 includes a second outlet 45 connected with line 21 which communicates with an inlet of pump 23. Line 21 also includes low pressure sump 25. Pump 23 provides fluid pressure via outlet line 27 which includes one-way pump check valve 31, line 27 communicating with pump inlet 32 of slave isolation valve 30, and with line 3 that includes fluid flow restriction 35 and communicates with inlet 42 of electrically actuated valve 40. Line 28 also communicates with line connection 28' that includes one-way check valve 29' and is connected with inlet 42' of electrically actuated valve 40' for left rear wheel brake 60. Left rear wheel brake 60 receives fluid from first outlet 44' via line 46', and communicates via line 46' and 48' with chamber 20 via one-way return check valve 49'. In a manner similar to front wheel brake 50, pump 23 communicates via line 27 with line 33' having fluid flow restriction 35', line 33' communicating with inlet 42' of electrically actuated valve 40'. Electrically actuated valve 40' includes outlet 45' communicating with line 21'. Accumulator 70 is connected with line 27 and will receive pump pressure when the pump is operating. However, when pump 23 is not operating, the pressure in accumulator 70 will be essentially zero. The braking circuit for primary chamber 18 of master cylinder 12 has the same configuration as illustrated for right front wheel brake 50 and left rear wheel brake 60, with pump 23, accumulator 70 and sump 25 being utilized for that circuit.

Slave isolation valve 30 includes valve member 34 biased by spring 36 (the use of spring 36 being optional) and which defines master cylinder pressure chamber 38 communicating with inlet 24 and outlet 26, and pump pressure chamber 37 communicating with pump inlet 32.

Adaptive braking system 10 operates in the following manner. During normal braking, pressure within master cylinder pressure chamber 20 is communicated through line 22 to inlet 24, master cylinder chamber 38 of valve 30, outlet 26, line 28, electrically actuated valve 40, line 46 and to right front wheel brake 50. In like manner, fluid pressure communicated through outlet 26 is communicated with line 28', valve 40', line 46' and left rear wheel brake 60. When an electronic control unit 100 determines an imminent wheel skid via a wheel speed sensor, unit 100 actuates one or more electrically actuated valves (40, 40') and pump 23. The actuation of one or more valves (40, 40') permits the immediate decay of fluid pressure away from the respective wheel brakes and to the inlet side of pump 23. The generation of hydraulic pressure by pump 23 results in valve member 34 being displaced toward inlet 24 and valve end 90 closing inlet 24 so that master cylinder 12 is isolated substantially from system 10. Slave isolation valve 30 will open during a termination phase of the adaptive braking cycle when the pressure from both brakes 50 and 60 essentially equals accumulator 70 pressure.

Figure 2:
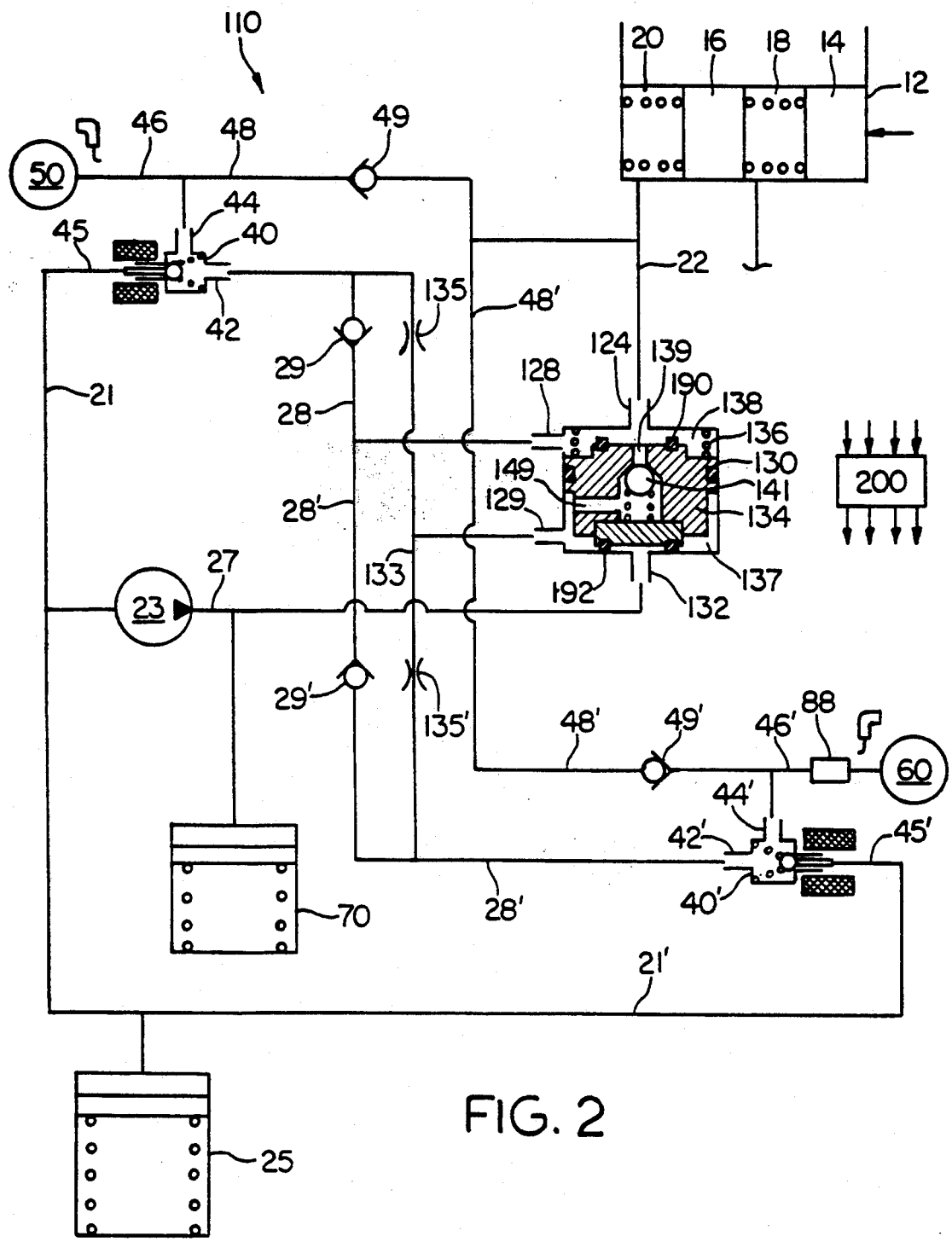
FIG. 2 is a schematic illustration of a modification of the adaptive braking system of FIG. 1 wherein the slave isolation valve includes a bypass check valve passage for master cylinder generated pressure.

Referring to FIG. 2, the components and line connections which are identical to those in FIG. 1 are identified by the same numerals. Adaptive braking system 110 includes slave isolation valve 130 which includes master cylinder pressure chamber 138 and pump pressure chamber 137. Valve member 134 biased by spring 136 (whose use is optional) includes sealing means 190 to seal off master cylinder inlet 124, sealing means 192 to seal off pump inlet 132, and through opening 139 including fluid check valve 141. Slave isolation valve 130 communicates with first outlet 128 and second outlet 129. First outlet 128 communicates with electrically actuated valve 40 via line 28 and check valve 29 while second outlet 129 communicates with electrically actuated valve 40 via line 133 and build restriction 135. During normal braking, valve member 134 is displaced by pressure from master cylinder chamber 20 so that sealing means 192 closes off pump inlet 132 and master cylinder pressure or brake pressure will not pass to the accumulator and pump via line 27 during normal braking. During adaptive braking, electronic control unit 200 activates pump 23 which will generally exceed master cylinder pressure and displace valve member 134 upwardly so that sealing means 190 closes off inlet 124 and isolates the master cylinder. Pump pressure proceeds through pump pressure chamber 137, out second outlet 129, and through build restriction 135 to electrically actuated valve 40 for effecting an increase of braking pressure after the initial decay of braking pressure. Should master cylinder pressure exceed pump generated pressure, check valve 141 will be displaced from its seat and permit master cylinder pressure to proceed through valve member 134 and outlet 149 to second outlet 129 for communication through line 133 and restriction 135 to valve 140. Left rear wheel 60 includes in line 46' conventional proportioning valve 88.

Figure 3:
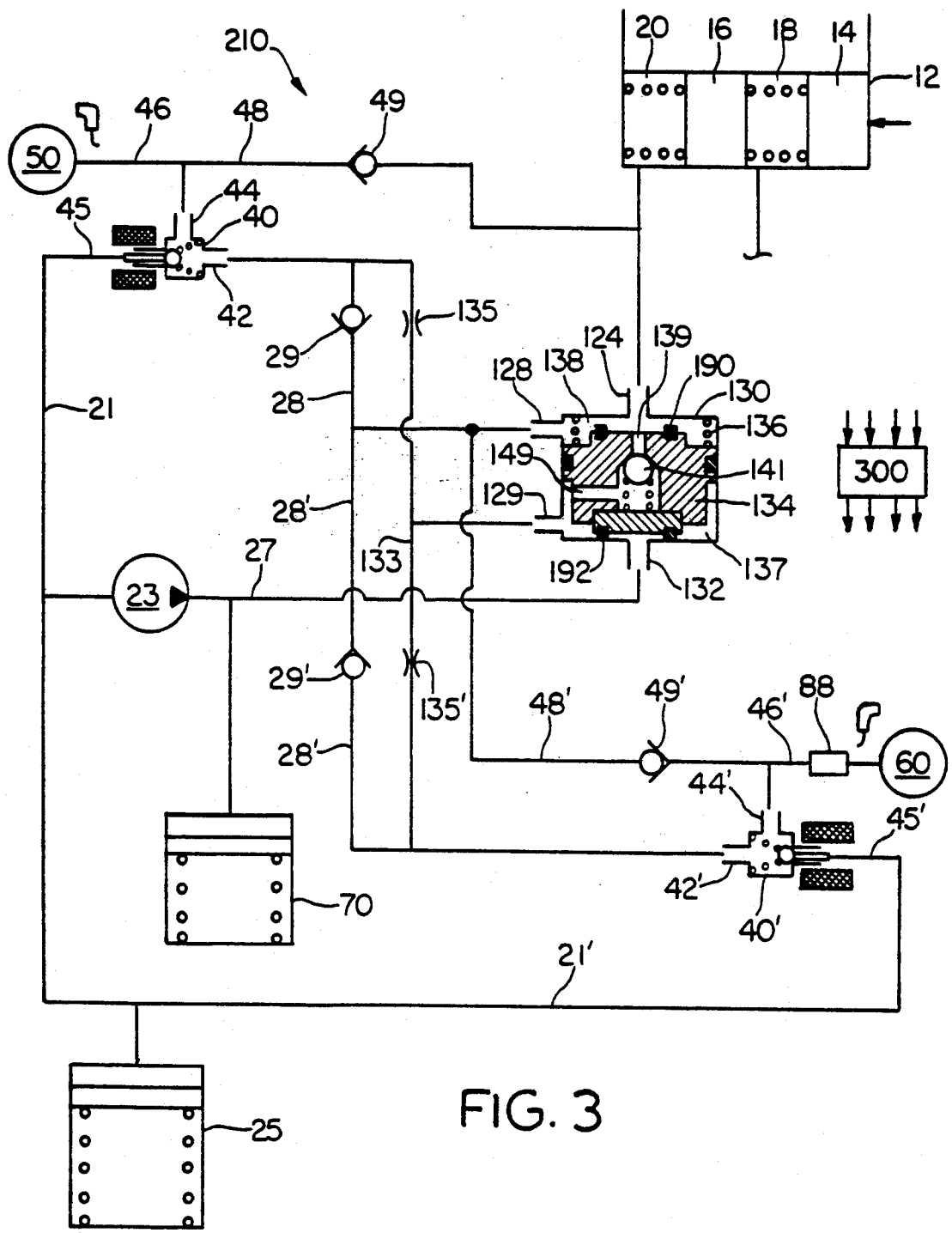
FIG. 3 is a schematic illustration of a modified form of the adaptive braking system illustrated in FIG. 3 and which provides for release fluid flow from a rear brake through the slave isolation valve.

Referring to FIG. 3, adaptive braking circuit 110 of FIG. 2 is illustrated as adaptive braking circuit 310 with one important change to the circuit. In FIG. 2, return line 48' for left rear wheel brake 60 connects with return line 48 so that both lines connect with master cylinder line 22. During the release phase of braking, braking pressure can be release to master cylinder chamber 20. In adaptive braking system 210 of FIG. 3, the connection of return line 48' with return line 48 has been removed so that release or return line 48' is connected to the right front wheel brake 50 flow circuit. Return line 48' terminates at line 28 so that return flow from left rear wheel brake 60 will proceed through master cylinder pressure chamber 138 of slave isolation valve 134 and back to master cylinder chamber 20 via line 22. This flow path can reduce pedal pump back feel that could result when rear proportioning valve 88 causes supply pressures greater than master cylinder pressure.

Figure 4:
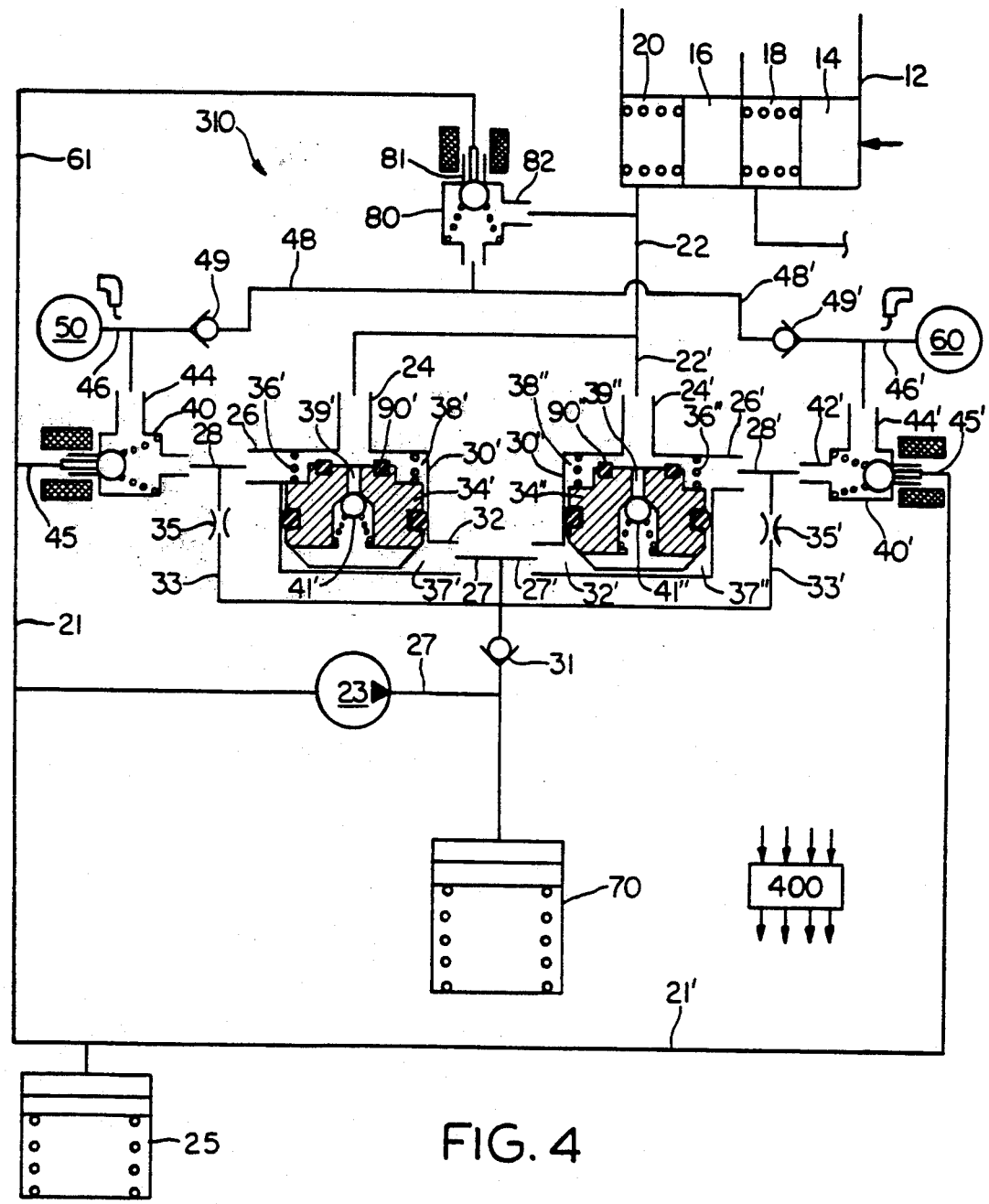
FIG. 4 is a schematic illustration of a modified adaptive braking system which includes two modified slave isolation valves each with a check valve passage and the addition of a traction control valve.

FIG. 4 illustrates a modification of the adaptive braking system of the present invention. Adaptive braking system 310 does not include check valves 29, 29' (FIGS. 1-3). Additionally, system 310 includes line 61 which communicates outlets 45, 45' of electrically actuated valves 40, 40' with traction control supply valve 80. Electrically actuated supply valve 80 is connected with release lines 48, 48' so that when the valve is actuated, fluid can be kept from flowing through release lines 48, 48' to master cylinder pressure chamber 20. The primary purpose of supply valve 80 is to provide fluid flow from the master cylinder reservoir through chamber 20, valve 80, lines 61, 21 and to the inlet of pump 23 during traction control operation. Slave isolation valves 30' and 30" comprise valve members 34' and 34" biased by springs 36' and 36" (whose use is optional) and which include therein through openings 39' and 39" through which fluid flow is controlled by respective check valves 41' and 41". Each valve member 34', 34" includes respective seals 90', 90" for sealing off inlets 24, 24' in accordance with the position of the valve members. During normal braking operation, system 310 operates the same as described above for FIG. 1 except that fluid pressure from the master cylinder does not pass through the one-way check valve 29, 29' (see FIGS. 1-3) before communicating with the respective wheel brake via the associated electrically actuated valve. When a wheel speed sensor senses an imminent wheel skid, electronic control unit 400 activates pump 23 and also activates electrically actuated valves 40, 40' to effect a decay of fluid pressure away from the respective wheel brakes. Fluid pressure from pump 23 causes valve members 34' 34" to be displaced so that seals 90', 90" effect a closure of fluid flow through inlets 24, 24'. Fluid pressure from pump 23 also passes through lines 33, 33', fluid restrictions 35, 35' and to electrically actuated valves 40, 40' where modulation of the valves effects build and decay cycles of fluid pressure communicated with the respective wheel brakes. Check valves 41', 41" may open if fluid pressure from master cylinder pressure chamber 20 exceeds the pressure within pump chambers 37', 37". The purpose of interior check valves 41', 41" is to provide valve members 34', 34" that are responsive to an actuating pressure be it from either master cylinder 12 or pump 23 and accumulator 70, in order to permit the higher master cylinder pressure to be transmitted to the electrically actuated valves via the fluid restrictions. Such a configuration prevents a fast build and rapid pedal drop that would otherwise occur when the slave isolation valves open. During traction control operation, pump 23 and supply valve 80 are activated to draw fluid from the master cylinder reservoir and chamber 20 to the pump 23 for transmission to slave isolation valves 30, 30' and restrictions 35, 35'. The pressure differential across valve members 34, 34' causes them to close inlets 24, 24' and fluid pressure is transmitted to each wheel brake whose associated valve 40, 40' is not activated. Decay occurs by activating the respective valve 40, 40'.

Figure 5:
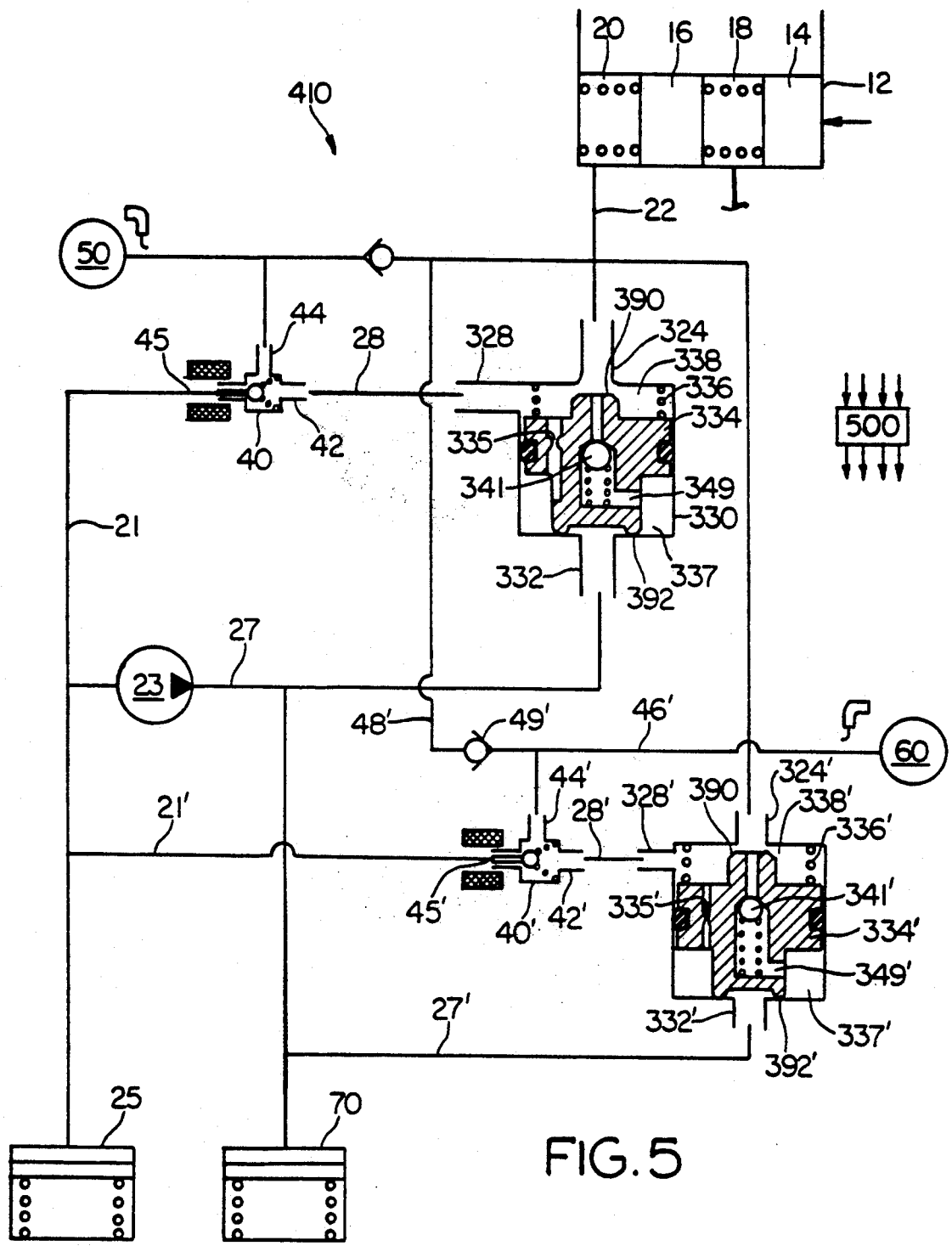
FIG. 5 is a schematic illustration of an adaptive braking system similar to FIG. 4 and having another form of the slave isolation valve of the present invention.

Referring to FIG. 5, adaptive braking system 410 includes slave isolation valve 330 for right front wheel brake 50 and slave isolation valve 330' for left rear wheel brake 60. Slave isolation valves 330, 330' are very similar to the valves illustrated in FIGS. 2 and 3 except that sealing means 392, 392' comprise valve member abutments rather than the elastomeric seals illustrated previously. However, sealing means 392, 392' effect closures of pump inlets 332, 332' which will prevent fluid pressure from passing to the pump and accumulator via lines 27, 27' during normal braking. Comparing system 410 with system 110 and 210 of FIGS. 2 and 3, the flow of fluid pressure through check valves 29, 29' in lines 28, 28' during normal braking has been eliminated and fluid flow restrictions 235, 235' have been integrated into valve members 334, 334' as restrictions 335 and 335'. This enables slave isolation valves 330, 330' to eliminate the second outputs 229, 229' so that only first outlets 328 and 328' are required for both normal braking and adaptive braking build pressure flow. Check valves 341 and 341' are present so that either master cylinder pressure or pump and accumulator pressure becomes the actuating pressure to hold valve members 334 and 334' in their respective isolating positions, i.e. isolation of the master cylinder or isolation of the pump. Again, the use of springs 336, 336' biasing valve members 334, 334' is optional.

The adaptive braking systems illustrated herein with the respective slave isolation valves provide improved adaptive braking systems that permit the utilization of low cost three or four channel systems with minimal added complexity or functional risk. The adaptive braking systems disclosed herein are "X" or cross type adaptive braking systems, but can also be easily modified to provide a typical "Y" or three channel system wherein an adaptive braking system channel is present for each of the front wheels and one channel is present for both of the rear wheels in combination. The adaptive braking systems with slave isolation valves of the present invention eliminate the utilization of the pressure sensitive shuttle valves described in reference to the above cited copending patent applications, and can reduce the pedal drop and fast build that can result when a shuttle valve of such a system opens and when master cylinder pressure exceeds accumulator pressure. Only one electrically actuated solenoid valve per channel is required, and a traction control function can be added to the systems with minimal revision. There is no risk of the slave isolation valves closing upon a spike application of braking pressure. The slave isolation valves disclosed herein provide safety and functional features with improved pedal feel and cycle function. Additionally, braking pressure for normal braking does not pass through the fluid flow restrictions which serve as build orifices.

I claim:

1. A closed circuit, pump-back adaptive braking system for an automotive vehicle having a pair of axles with a pair of wheels and brakes on each axle, said system including a master cylinder for actuation by a vehicle operator, said master cylinder having a pressure chamber in which hydraulic braking pressure is developed when a brake application is effected, a first braking circuit hydraulically communicating said pressure chamber with one brake controlling a wheel on one of said axles, the first braking circuit comprising a salve isolation valve connected with electrically actuated valve means communicating with the one brake, the electrically actuated valve means communicating with a first line connected with an inlet side of a pump and said first line communicating with sump means, the pump including an outlet communicating with both the slave isolation valve and restriction means at a point therebetween the restriction means located in a line disposed in parallel with said isolation slave valve so that fluid pressure from the pump to the electrically actuated valve means bypasses the slave isolation valve, the slave isolation valve comprising a master cylinder chamber communicating with the pressure chamber of the master cylinder and a pump chamber communicating with the pump, and a valve member having a through opening with fluid check valve means disposed within the through opening, and a return line communicating the one brake with the pressure chamber of the mater cylinder and including check valve means, hydraulic braking pressure received from the pressure chamber of the master cylinder causing said slave isolation valve to remain in an open position when said pump is not operating, and operation of said pump causing the valve member of said slave isolation valve to close and isolate the pressure chamber of the master cylinder from the electrically actuated valve means, and when pressure from the master cylinder exceeds pressure form the pump the master cylinder able to communicate fluid pressure through the through opening and past the fluid check valve means to the restriction means and electrically actuated valve means without opening the valve member of the slave isolation valve.

2. The adaptive braking system in accordance with claim 1, further comprising an accumulator and a reverse flow check valve communicating with the outlet of said pump.

3. The adaptive braking system in accordance with claim 1, wherein an outlet line of the pressure chamber of said master cylinder communicates with the electrically actuated valve means via the return line and check valve means.

4. The adaptive braking system in accordance with claim 1, further comprising second electrically actuated valve means having dual line connections, one of said dual line connections connected with the pressure chamber of the master cylinder via the slave isolation valve and the other dual line connection connected with the return line.

5. The adaptive braking system in accordance with claim 1, further comprising second electrically actuated valve means, and the first and second electrically actuated valve means connected with one another via a dual line connection wherein a pair of check valve means is connected in parallel with a pair of said restriction means.

6. The adaptive braking system in accordance with claim 1, wherein the first line is connected with second electrically actuated valve means having dual line connections, one of said dual line connections connected directly with the pressure chamber of the master cylinder and the other of the dual line connections connected with the return line.

7. The adaptive braking system in accordance with claim 6, further comprising a second slave isolation valve and a third electrically actuated valve means having two line connections, one of said line connections connected with the pressure chamber of the master cylinder via the second slave isolation valve and the other of the line connections connected with the return line.

8. A closed circuit, pump-back adaptive braking system for an automotive vehicle having a pair of axles with a pair of wheels and brakes on each axle, said system including am aster cylinder for actuation by a vehicle operator, said master cylinder having a pressure chamber in which hydraulic braking pressure is developed when a brake application is effected, a first braking circuit hydraulically communicating said chamber with one brake controlling a wheel on one of said axles, said first braking circuit comprising a connection line communicating the pressure chamber of the master cylinder with a master cylinder inlet of a slave isolation valve, a first outlet of a master cylinder chamber of said slave isolation valve connected with an electrically actuated valve means via first check valve means, the electrically actuated valve means connected with the one brake and having an outlet communicating with sump means and an inlet of pump means, the pump means connected with an outlet line including accumulator means and communicating with a pump inlet of the slave isolation valve, the slave isolation valve comprising a pump chamber having a second outlet communicating with the electrically actuated valve means via fluid flow restriction means, and a valve member having an interior opening communicating with the pressure chamber of the master cylinder and with the pump chamber and including fluid check valve means, and a return line communicating said one brake with the pressure chamber of the master cylinder and including second check valve means, such that hydraulic braking pressure from the pressure chamber of the master cylinder causes the valve member of said slave isolation valve to close the pump inlet of the slave isolation valve and permit fluid flow from said first outlet to the electrically actuated valve means, and operation of said pump means causing said slave isolation valve to close the master cylinder inlet and permit fluid flow from the pump means to pass through the slave isolation valve means, and when the hydraulic braking pressure from the master cylinder exceeds pressure from the pump means the master cylinder able to communicate fluid pressure through the interior opening and past the fluid check valve means to the fluid flow restriction means and electrically actuated valve means without opening the valve member of the slave isolation valve the master cylinder inlet.

9. The adaptive braking system in accordance with claim 8, wherein the valve member of the slave isolation valve has at opposite sides sealing means which enables closure of the master cylinder and pump inlets of the slave isolation valve in accordance with the position of the valve member.

10. The adaptive braking system in accordance with claim 8, further comprising a rear wheel brake having a return line communicating with the first outlet of the slave isolation valve, second electrically actuated valve means having an outlet communicating with the rear wheel brake, a second outlet communicating with said inlet of the pump means, and an inlet communicating with the first outlet of the slave isolation valve and communicating with said second outlet of the slave isolation valve via restriction means.

11. A closed circuit, pump-back adaptive braking system for an automotive vehicle having a pair of axles with a pair of wheels and brakes on each axle, said system including a master cylinder for actuation by a vehicle operator, said master cylinder having a pressure chamber in which hydraulic braking pressure is developed when a brake application is effected, a first braking circuit hydraulically communicating said pressure chamber with one brake controlling a wheel on one of said axles, the first braking circuit comprising a line connecting the pressure chamber of the master cylinder with a master cylinder inlet of a slave isolation valve, the slave isolation valve having a fluid outlet communicating with electrically actuated valve means that communicates with the one brake, the one brake communicating with a return line having first check valve means and connected with the pressure chamber, the electrically actuated valve means having an outlet connected with sump means and an inlet of a pump, the pump having an outlet line connected with a pump inlet of said slave isolation valve, and the slave isolation valve comprising a valve member defining at one side thereof a master pressure chamber communicating with the master cylinder inlet and fluid outlet and on the other side a pump hydraulic pressure chamber communicating with the pump inlet, the valve member including both a first opening therethrough containing fluid flow restriction means so that fluid may flow between said pump hydraulic pressure chamber and master pressure chamber and a second opening which includes second check valve means and permits hydraulic braking pressure of the master cylinder to displace selectively the second check valve means and communicate braking pressure to the pump hydraulic pressure chamber for communication through the fluid flow restriction means, hydraulic braking pressure received from the pressure chamber of the master cylinder causing said slave isolation valve to remain in an open position when said pump is not operating, and operation of said pump causing the valve member of said slave isolation valve to close and isolate the pressure chamber of the master cylinder from the electrically actuated valve means, and when hydraulic braking pressure from the master cylinder exceeds pressure from the pump the master cylinder able to communicate fluid pressure through the second opening and past the second check valve means to the fluid flow restriction means and electrically actuated valve means without opening the valve member of the slave isolation valve.

12. The adaptive braking system in accordance with claim 11, wherein the valve member includes in each chamber thereof an end member which may close respectively the master cylinder inlet and pump inlet depending on the position of the valve member.

13. The adaptive braking system in accordance with claim 12, further comprising a second slave isolation valve receiving hydraulic braking pressure from the pressure chamber of the master cylinder and having a pump pressure inlet, second electrically actuated valve means connected with an outlet of the second slave isolation valve and having an outlet connected with a second brake and a return line of the second brake communicating with the pressure chamber of the master cylinder via third check valve means.

14. The adaptive braking system in accordance with claim 11, wherein the second opening which includes the second check valve means within the valve member opens at a lateral side portion of said valve member.

* * * * *